A. G. ANDERSON.
VOUCHER CHECK.
APPLICATION FILED SEPT. 18, 1917.
1,260,850. Patented Mar. 26, 1918.
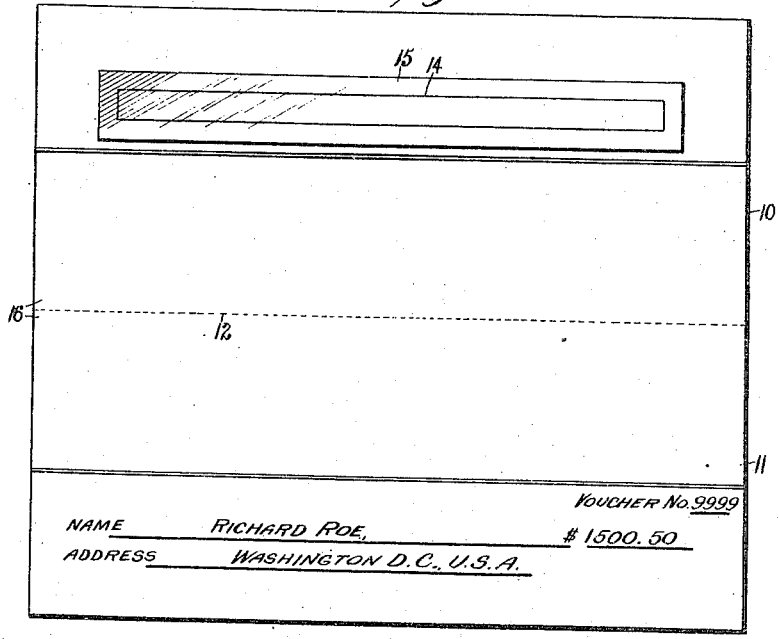
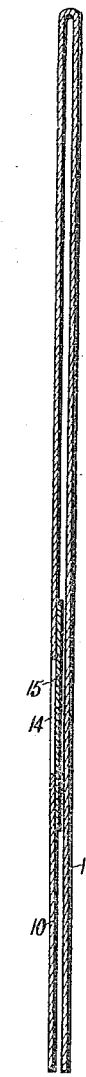
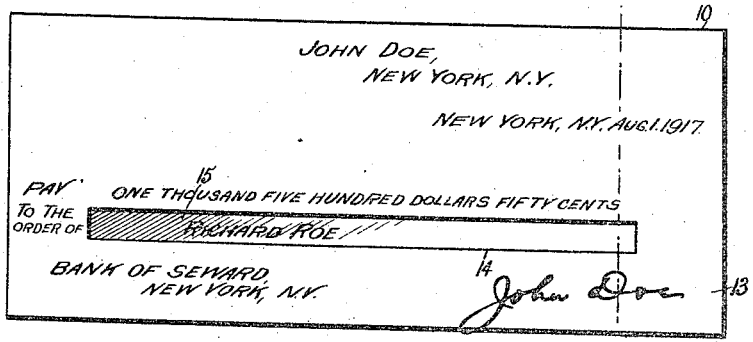
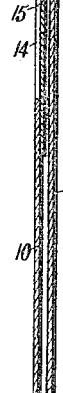
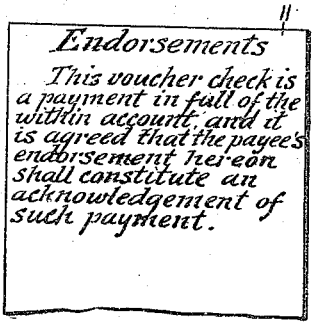
WITNESSES
INVENTOR
Arvid G. Anderson
BY
ATTORNEYS

UNITED STATES PATENT OFFICE.

ARVID GEORAN ANDERSON, OF SEWARD, TERRITORY OF ALASKA.

VOUCHER-CHECK.

1,260,850.     Specification of Letters Patent.     Patented Mar. 26, 1918.

Application filed September 18, 1917. Serial No. 191,946.

*To all whom it may concern:*

Be it known that I, ARVID G. ANDERSON, a citizen of the United States, and a resident of Seward, Territory of Alaska, have invented a new and Improved Voucher-Check, of which the following is a full, clear, and exact description.

My invention relates to voucher checks employed in lieu of a separate check and bill or statement, and made out and issued by the drawer of the check who may desire to retain the original bill or voucher, in addition to utilizing the check as a receipt for the payment of the voucher, and the prime object of the invention is to provide a voucher check that will result in a material saving of time by necessitating the writing of the payee's name but once only instead of requiring the writing of the payee's name several times as is necessary with the ordinary voucher check.

The stated object is attained by an instrument foldable on itself on an approximately median line, that portion at one side of the median line constituting a check, and the portion at the opposite side of the median line pertaining to a voucher, one of said portions having a window therein and the other having a space thereon for the name of the payee and so located that said name will appear at and be readable through the window when the instrument is folded on itself, whereby the one writing of the payee's name or the printing thereof by a typewriter will answer for both the check and voucher. At one side the instrument presents a zone or central panel extending across the median line over parts of both of said check portion and voucher portion, to receive the bill or account.

Reference is to be had to the accompanying drawings.

Figure 1 is a rear view of a voucher check embodying my invention showing the same unfolded;

Fig. 2 is a face view with the check part folded over on the voucher part of the instrument;

Fig. 3 is an enlarged transverse section on the line 3—3, Fig. 2;

Fig. 4 is a fragmentary rear view of the folded instrument.

In carrying out my invention in practice, the improved voucher check is produced of a size for one-half, 10, thereof to constitute a check and the other half, 11, to constitute the voucher. The numeral 12 in Fig. 1 indicates the imaginary central line on which the instrument is folded, the numeral 13 indicating the face of the portion 10 bearing the matter constituting the same a check, as indicated in Fig. 2. The matter on the check in the illustrated example is the drawer's name "John Doe, New York, N. Y.", the date "New York, N. Y., August 1, 1917", the check being drawn on the "Bank of Seward, New York, N. Y." The indicated amount of the check as drawn in the illustrated example is one thousand five hundred dollars and fifty cents.

In the said check portion 10 of the instrument a window 14 is formed covered by a film 15 of transparent material. Said window is so located in said check in the position that would be occupied by the usual blank space for the payee's name, the words "To the order of" being at the front end of said window on the face of the check. On one face of the other portion 11, that is to say, the opposite face of the instrument from the face 13 on which the matter constituting the check is produced, I produce as shown in Fig. 1 at the bottom, a space to receive the payee's name and address as well as the amount of the account and the number of the voucher, to wit: Voucher No. 9999; Name _____; $1550.50; Address _____. I have indicated the payee in this instance as "Richard Roe, Washington, D. C., U. S. A."

It will be observed that the window 14 and the space for the payee's name on the portion 11 are so located that when the instrument is folded on itself on the indicating folding line as 12, the window will overlie the written name of the payee "Richard Roe" so that said name will appear in the check through the window and in line with the directions "To the order of", as will clearly appear from a comparison of Figs. 1, 2 and 3. It will thus be seen that one writing only of the payee's name suffices for both the check and the voucher.

The instrument presents a broad zone 16 at one side, that is to say, the side having the space on the voucher for the payee's name, the said zone extending over the adjacent parts of both the check portion 10 and the portion 11, and is adapted to receive the items of bill or account. Also the portion 11 at the opposite face from that bearing the payee's name, affords space for indorsements with the designation "Indorsements" as indicated in Fig. 4, and conveniently on that surface of the portion 11 accommodating the word "Indorsements" there is a notice produced that the voucher check is payment in full, the example of notice given in Fig. 4 being "This voucher check is a payment in full of the within account, and it is agreed that the payee's indorsement hereon shall constitute an acknowledgment of such payment."

I wish to state in conclusion that although the illustrated example constitutes a practical mode for carrying my invention into effect, I do not limit myself strictly to the exact details herein illustrated, since manifestly the same can be considerably varied without departure from the spirit of the invention as defined in the appended claims.

Having thus described my invention, I claim as new, and desire to secure by Letters Patent:

1. An instrument of the class described adapted to be folded on itself along approximately the median line thereof, that portion at one side of the median line bearing on a face thereof matter constituting said portion a check, the opposite face of the instrument presenting a zone to receive the bill or account, said zone extending at both sides of the said median line, the portion of the instrument at the opposite side of the median line bearing matter pertaining to a voucher, one of the said portions having a window therein, and the other of said portions having thereon a space for the name of the payee of the voucher check in position for the said name to appear at and be readable through the said window when the instrument is folded on itself, so that one writing of the payee's name will answer for the said name in both the voucher and check.

2. In an instrument of the class described adapted to be folded on itself at approximately the median line thereof, that portion at one side of the median line bearing on a face thereof matter constituting the same a check, the other portion having on a face thereof a space for the payee's name, and the said check portion having a longitudinally disposed window positioned to overlie the said space for the payee's name on the voucher portion, so that the name will appear through the window in the check when the instrument is folded on itself, said instrument presenting a zone extending partly over both of said portions on that face of the instrument having the said space for the payee's name on the voucher.

3. An instrument of the class described having at a portion thereof of one surface, matter constituting said portion a check, the remaining portion of the instrument constituting a voucher, said instrument being adapted to be folded on itself, one of said portions having a window therein, and the other of said portions having a space on a face thereof to receive the payee's name and located so that the said name will be visible through the said window when the instrument is folded on itself, both portions having respectively adjacent to the said space and the said window, matter indicating that the name to be written in the space and as appearing through the window is that of the payee.

ARVID GEORAN ANDERSON

Copies of this patent may be obtained for five cents each, by addressing the "Commissioner of Patents, Washington, D. C."